US012441495B2

(12) United States Patent
Ishikawa et al.

(10) Patent No.: US 12,441,495 B2
(45) Date of Patent: Oct. 14, 2025

(54) FLIGHT DEVICE AND FLIGHT DEVICE CONTROL METHOD

(71) Applicants: ISHIKAWA ENERGY RESEARCH CO., LTD., Ota (JP); KUBOTA CORPORATION, Osaka (JP)

(72) Inventors: Mitsuru Ishikawa, Ota (JP); Hiroyuki Nagashima, Ota (JP)

(73) Assignees: ISHIKAWA ENERGY RESEARCH CO., LTD., Ota (JP); KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/851,260

(22) PCT Filed: Mar. 16, 2023

(86) PCT No.: PCT/JP2023/010250
§ 371 (c)(1),
(2) Date: Sep. 26, 2024

(87) PCT Pub. No.: WO2023/189644
PCT Pub. Date: Oct. 5, 2023

(65) Prior Publication Data
US 2025/0214723 A1     Jul. 3, 2025

(30) Foreign Application Priority Data
Mar. 29, 2022   (JP) ................................ 2022-054026

(51) Int. Cl.
*B64U 50/27* (2023.01)
*B64D 31/06* (2006.01)
(Continued)

(52) U.S. Cl.
CPC .............. *B64U 50/27* (2023.01); *B64D 31/06* (2013.01); *B64U 50/11* (2023.01); *B64U 10/16* (2023.01)

(58) Field of Classification Search
CPC ........ B64U 50/27; B64U 50/11; B64U 10/16; B64U 20/94; B64D 31/06; B64D 35/00; B64D 27/40; B64C 27/32
See application file for complete search history.

(56) References Cited

U.S. PATENT DOCUMENTS 1,130,623 A * 3/1915 Mustonen ................. B64B 1/40
244/6
3,088,694 A * 5/1963 Stirgwolt ............ B64C 29/0016
244/12.3
(Continued)

FOREIGN PATENT DOCUMENTS

| JP | 2000-272593 A | 10/2000 |
|---|---|---|
| JP | 2011-251678 A | 12/2011 |
| JP | 2012-51545 A | 3/2012 |
| JP | 2014-240242 A | 12/2014 |
| WO | 2018/084261 A1 | 5/2018 |

(Continued)

OTHER PUBLICATIONS

International Search Report dated May 30, 2023, issued in counterpart International Application No. PCT/JP2023/010250, with English Translation. (5 pages).

(Continued)

*Primary Examiner* — Medhat Badawi
(74) *Attorney, Agent, or Firm* — WHDA, LLP

(57) ABSTRACT

Provided is a flight device and a flight device control method that ensure safety even if a defect occurs in a power connection/disconnection unit. Rotor-side power transmission units 26 of a flight device 10 include first and second rotor-side power transmission units 261 and 262. Power connection/disconnection units 27 transmit power according to conditions and include first and second power connection/disconnection units 271 and 272. The first power connection/disconnection unit 271 is provided between a first engine-side power transmission unit 251 and the first rotor-side power transmission unit 261. The second power connection/disconnection unit 272 is provided between a second (Continued)

engine-side power transmission unit 252 and the second rotor-side power transmission unit 262. The arithmetic control unit 31 changes the flight status when the degree to which the first power connection/disconnection unit 271 transmits the power and the degree to which the second power connection/disconnection unit 272 transmits the power differ by a certain amount or more.

10 Claims, 5 Drawing Sheets

(51) Int. Cl.
*B64U 50/11* (2023.01)
*B64U 10/16* (2023.01)

(56) References Cited

U.S. PATENT DOCUMENTS

| | | | | |
|---|---|---|---|---|
| 3,122,343 | A * | 2/1964 | Heinrich | B64C 29/0025 244/23 B |
| 3,249,323 | A * | 5/1966 | Vanderlip | B64C 29/0025 244/12.3 |
| 4,469,294 | A * | 9/1984 | Clifton | B64C 39/12 244/12.3 |
| 4,828,203 | A * | 5/1989 | Clifton | B64C 29/0033 244/12.3 |
| 5,890,441 | A * | 4/1999 | Swinson | B64U 10/13 244/12.3 |
| 6,254,504 | B1 * | 7/2001 | Goi | F16H 37/086 475/216 |
| 6,270,038 | B1 * | 8/2001 | Cycon | B64U 30/14 244/12.3 |
| 6,561,456 | B1 * | 5/2003 | Devine | B64C 29/0025 244/12.3 |
| D665,333 | S * | 8/2012 | Oliver | D12/330 |
| 8,636,241 | B2 * | 1/2014 | Lugg | B64D 27/24 244/12.3 |
| 9,316,159 | B2 * | 4/2016 | Dubreuil | F02C 7/36 |
| 9,676,479 | B2 * | 6/2017 | Brody | B64C 29/0033 |
| 9,714,090 | B2 * | 7/2017 | Frolov | B64C 29/0025 |
| 9,752,500 | B2 * | 9/2017 | Ullyott | F02C 3/113 |
| 10,053,207 | B2 * | 8/2018 | Cox | B64C 27/10 |
| 10,094,295 | B2 * | 10/2018 | Ullyott | F02C 3/113 |
| 10,131,426 | B2 * | 11/2018 | Judas | B64C 3/38 |
| 10,526,066 | B2 * | 1/2020 | Suzuki | B64D 27/24 |
| 10,662,875 | B2 * | 5/2020 | Lafargue | F01D 15/10 |
| 10,710,713 | B2 * | 7/2020 | Mia | B64C 29/0025 |
| 10,850,863 | B2 * | 12/2020 | Bisson | B64D 41/00 |
| 11,148,820 | B1 * | 10/2021 | Resnick | B64U 50/19 |
| 11,167,844 | B2 * | 11/2021 | Ivans | B64C 27/78 |
| 11,177,746 | B1 * | 11/2021 | Szmuk | B64U 50/19 |
| 11,299,287 | B1 * | 4/2022 | Moy | B64C 11/00 |
| 11,325,698 | B2 * | 5/2022 | Millhouse | B64C 37/02 |
| 11,394,335 | B1 * | 7/2022 | Szmuk | H02P 6/00 |
| 11,738,862 | B2 * | 8/2023 | Karem | B64C 29/0033 244/12.4 |
| 11,808,216 | B1 * | 11/2023 | Johnson | F02C 9/18 |
| 11,858,632 | B2 * | 1/2024 | Resnick | B60L 58/12 |
| 11,859,542 | B2 * | 1/2024 | Keller | F02C 6/04 |
| 11,945,573 | B2 * | 4/2024 | Baladi | B64C 29/0033 |
| 11,987,349 | B2 * | 5/2024 | Sheil | B64C 29/0016 |
| 11,993,375 | B2 * | 5/2024 | Resnick | B64U 10/13 |
| 12,068,710 | B2 * | 8/2024 | Kawadu | H02P 29/024 |
| 12,071,228 | B1 * | 8/2024 | Nielsen | B64U 30/299 |
| 12,168,510 | B2 * | 12/2024 | Kowald | B64U 50/19 |
| 12,172,767 | B2 * | 12/2024 | Resnick | B64U 50/11 |
| 12,240,621 | B2 * | 3/2025 | Resnick | B64U 50/23 |
| 12,263,969 | B1 * | 4/2025 | Little | B64U 60/60 |
| 12,286,250 | B2 * | 4/2025 | Suzuki | B64U 10/25 |
| 2003/0094537 | A1 * | 5/2003 | Austen-Brown | B64C 27/28 244/7 R |
| 2004/0144890 | A1 * | 7/2004 | Mao | B64C 29/0025 244/12.5 |
| 2004/0245374 | A1 * | 12/2004 | Morgan | B64C 29/0025 244/12.3 |
| 2007/0034739 | A1 * | 2/2007 | Yoeli | B64C 29/0025 244/23 R |
| 2008/0045373 | A1 * | 2/2008 | Rodgers, II | F16H 37/042 475/319 |
| 2008/0169375 | A1 * | 7/2008 | Ishikawa | F02C 3/107 244/12.1 |
| 2008/0184906 | A1 * | 8/2008 | Kejha | B64D 35/025 102/374 |
| 2012/0012692 | A1 * | 1/2012 | Kroo | B64C 29/0025 244/6 |
| 2012/0056034 | A1 * | 3/2012 | Kosheleff | B64C 29/0025 244/58 |
| 2012/0280091 | A1 * | 11/2012 | Saiz | B64C 27/30 244/6 |
| 2013/0062455 | A1 * | 3/2013 | Lugg | B64C 29/0025 244/12.3 |
| 2013/0227950 | A1 * | 9/2013 | Anderson | B64D 35/08 60/718 |
| 2014/0060004 | A1 * | 3/2014 | Mast | B64D 33/04 60/228 |
| 2014/0084080 | A1 * | 3/2014 | Robertson | F02K 1/825 239/127.3 |
| 2014/0220873 | A1 * | 8/2014 | Bleechmore | B64U 20/92 454/141 |
| 2014/0248168 | A1 * | 9/2014 | Chantriaux | B64D 35/024 417/410.1 |
| 2017/0036762 | A1 * | 2/2017 | Gamble | B64U 70/20 |
| 2017/0058812 | A1 * | 3/2017 | Park | B60W 20/10 |
| 2017/0158321 | A1 * | 6/2017 | Mia | B64C 29/005 |
| 2017/0225573 | A1 * | 8/2017 | Waltner | B64D 35/023 |
| 2017/0240290 | A1 * | 8/2017 | Dumur | B64D 35/08 |
| 2017/0253331 | A1 * | 9/2017 | Nakashima | B64D 35/04 |
| 2017/0297679 | A1 * | 10/2017 | Elliott | B64D 35/08 |
| 2018/0141652 | A1 * | 5/2018 | Deslypper | B64D 27/31 |
| 2018/0354623 | A1 * | 12/2018 | Bhat | B64U 30/24 |
| 2019/0047720 | A1 * | 2/2019 | Bosma | B64D 35/025 |
| 2019/0256191 | A1 * | 8/2019 | Suzuki | B64C 17/00 |
| 2019/0256202 | A1 * | 8/2019 | Resnick | B64U 10/13 |
| 2019/0263519 | A1 * | 8/2019 | Argus | B64U 50/11 |
| 2020/0039657 | A1 * | 2/2020 | Ransom | B64D 41/00 |
| 2020/0324894 | A1 * | 10/2020 | Fredericks | B64D 27/02 |
| 2021/0016880 | A1 * | 1/2021 | Ishikawa | F02B 61/04 |
| 2021/0316874 | A1 * | 10/2021 | Resnick | B64D 33/08 |
| 2021/0364387 | A1 * | 11/2021 | Belhabib | B64D 45/00 |
| 2022/0055743 | A1 * | 2/2022 | Kamio | B64D 31/16 |
| 2022/0106050 | A1 * | 4/2022 | Resnick | B64C 27/32 |
| 2022/0111960 | A1 * | 4/2022 | Tran | B64D 1/18 |
| 2022/0388635 | A1 * | 12/2022 | Ishikawa | B64C 25/26 |
| 2023/0036722 | A1 * | 2/2023 | Hanamitsu | F02D 29/06 |
| 2023/0221166 | A1 * | 7/2023 | Ono | G01G 19/52 177/136 |
| 2023/0365268 | A1 * | 11/2023 | Resnick | B64D 35/02 |
| 2024/0336379 | A1 * | 10/2024 | Ishikawa | B64U 10/13 |
| 2024/0343421 | A1 * | 10/2024 | Ishikawa | B64D 31/06 |
| 2024/0343423 | A1 * | 10/2024 | Ishikawa | B64U 50/11 |
| 2024/0343425 | A1 * | 10/2024 | Ishikawa | B64U 30/20 |
| 2024/0375766 | A1 * | 11/2024 | Freer | B64D 27/10 |
| 2024/0377838 | A1 * | 11/2024 | Gazzino | F02C 9/42 |
| 2024/0415078 | A1 * | 12/2024 | Gelin | A01G 23/095 |
| 2024/0419190 | A1 * | 12/2024 | Hattori | G05D 1/692 |
| 2025/0033761 | A1 * | 1/2025 | Ishikawa | B64U 30/24 |
| 2025/0108942 | A1 * | 4/2025 | Ishikawa | B64D 27/04 |
| 2025/0121963 | A1 * | 4/2025 | Melcher | B64U 30/297 |
| 2025/0143236 | A1 * | 5/2025 | Andersson | B64U 10/16 |

FOREIGN PATENT DOCUMENTS

WO     2020/137103 A1    7/2020

OTHER PUBLICATIONS

Written Opinion of the International Searching Authority (Form PCT/ISA/237) dated May 30, 2023, issued in counterpart International Application No. PCT/JP2023/010250. (4 pages).

\* cited by examiner

FLIGHT DEVICE AND FLIGHT DEVICE CONTROL METHOD

TECHNICAL FIELD

The present invention relates to a flight device and specifically relates to a flight device in which the main rotor is driven by an engine and a method of controlling the flight device.

BACKGROUND ART

Flight devices capable of unmanned flight in the air have been known. Such a flight device is able to fly in the air using the thrust of a rotor rotating about a vertical axis.

Application fields of such flight devices include the field of transportation, the field of surveying, and the field of photography, for example. In the case of applying the flight devices to such fields, surveying equipment and photography equipment are attached to the flight devices. When the flight devices are applied to such fields, the flight devices can fly in areas that human cannot access and perform transportation, photographing, and surveying of such areas. Inventions relating to such flight devices are described in Patent Literature 1 and Patent Literature 2, for example.

In a typical flight device, the aforementioned rotor rotates using electric power supplied from a storage battery mounted on the flight device. However, energy supply by the electric power of the storage battery may not always be sufficient. In order to implement a continuous flight over a long period of time, flight devices equipped with engines also have emerged. In such a flight device, a generator is rotated using driving force of the engine, and the rotor is rotationally driven using electric power generated by the generator. In flight devices having such a configuration, the engine and the generator are connected in series on a path of energy supplied from the power source to the rotor. Such a flight device is therefore called a series-type drone. Use of such flight devices enables photography and surveying of wide areas. A flight device equipped with an engine is described in Patent Literature 3, for example. Furthermore, parallel-type hybrid drones are also gradually emerging, in which the main rotor is mechanically rotated using the driving force of the engine and a sub-rotor is rotated using a motor.

CITATION LIST

Patent Literature

Patent Literature 1: Japanese Unexamined Patent Application Publication No. 2012-51545
Patent Literature 2: Japanese Unexamined Patent Application Publication No. 2014-240242
Patent Literature 3: Japanese Unexamined Patent Application Publication No. 2011-251678

SUMMARY OF INVENTION

Technical Problem

However, the conventional flight devices described above still have a room for improvement in the driving system mechanism.

Specifically, as described above, in an engine-driven drone, a power connection/disconnection unit, such as a clutch, is provided between the engine and the rotor. The power connection/disconnection unit is, for example, a centrifugal clutch, which does not connect the engine to the rotor while the engine speed is low and connects the engine to the rotor when the engine speed is increased.

However, there are individual variations in the timing and engine speed at which power connection/disconnection is performed due to tolerances and so on in machining accuracy of the power connection/disconnection unit. Such individual variations may adversely affect the operation of the flight device. For example, during takeoff of a drone, if only the rotor on the left rotates while the rotor on the right does not, it is difficult to control the drone's orientation during takeoff of the drone.

The present invention was made in the light of the aforementioned circumstances, and an object thereof is to provide a flight device and a flight device control method which ensure safety even if a defect occurs in the power connection/disconnection unit.

Solution to Problem

A flight device of the present invention includes: an airframe; a main rotor; an engine; an engine-side power transmission unit; a rotor-side power transmission unit; a power connection/disconnection unit; and an arithmetic control unit, the main rotor rotates to generate driving force necessary for the airframe to float, the engine generates power necessary for the main rotor to rotate, the engine-side power transmission unit rotates using the power of the engine, the rotor-side power transmission unit is drivingly connected to the main rotor, the power connection/disconnection unit is provided between the engine-side power transmission unit and the rotor-side power transmission unit and transmits the power from the engine-side power transmission unit to the rotor-side power transmission unit according to conditions, and the arithmetic control unit changes a flight status when the degree to which the power connection/disconnection unit transmits the power differs from a predetermined value by a certain amount or more.

A flight device of the present invention includes: an airframe; a main rotor; an engine; an engine-side power transmission unit; a rotor-side power transmission unit; a power connection/disconnection unit; and an arithmetic control unit, the main rotor rotates to generate driving force necessary for the airframe to float and includes a first main rotor and a second main rotor, the engine generates power necessary for the first main rotor and the second main rotor to rotate, the engine-side power transmission unit rotates using the power of the engine and includes a first engine-side power transmission unit and a second engine-side power transmission unit, the rotor-side power transmission unit includes a first rotor-side power transmission unit drivingly connected to the first main rotor and a second rotor-side power transmission unit drivingly connected to the second main rotor, the power connection/disconnection unit transmits the power according to conditions and includes a first power connection/disconnection unit and a second power connection/disconnection unit, the first power connection/disconnection unit is provided between the first engine-side power transmission unit and the first rotor-side power transmission unit, the second power connection/disconnection unit is provided between the second engine-side power transmission unit and the second rotor-side power transmission unit, and the arithmetic control unit changes a flight status when the degree to which the first power connection/disconnection unit transmits the power and the degree to which the second power connection/disconnection unit transmits the power differ by a certain amount or more.

The flight device of the present invention further includes: a first rotational speed measurement unit measuring rotational speed of the first rotor-side power transmission unit; and a second rotational speed measurement unit measuring rotational speed of the second rotor-side power transmission unit, the arithmetic control unit changes the flight status when the rotational speed of the first rotor-side power transmission unit measured by the first rotational speed measurement unit and the rotational speed of the second rotor-side power transmission unit measured by the second rotational speed measurement unit differ by a certain amount or more.

In the flight device of the present invention, in a case of changing the flight status in a landing state, the arithmetic control unit stops the engine.

In the flight device of the present invention, in a case of changing the flight status in a flight state, the arithmetic control unit lands the flight device by using the driving force of the engine.

The flight device of the present invention further includes: a sub-rotor; and a motor that rotates the sub-rotor, in a case of changing the flight status in a flight state, the arithmetic control unit stops the engine and lands the flight device by rotating the sub-rotor using the motor.

In the flight device of the present invention, in a case of flight from a landing state, the arithmetic control unit cancels the flight when the difference between the degree to which the first power connection/disconnection unit transmits the power and the degree to which the second power connection/disconnection unit transmits the power is greater than a first setting value.

In the flight device of the present invention, during flight, the arithmetic control unit lands the flight device while running the engine when the difference between the degree to which the first power connection/disconnection unit transmits the power and the degree to which the second power connection/disconnection unit transmits the power is greater than a second setting value.

In the flight device of the present invention, during flight, the arithmetic control unit lands the flight device with the engine stopped when the difference between the degree to which the first power connection/disconnection unit transmits the power and the degree to which the second power connection/disconnection unit transmits the power is greater than a third setting value.

In the flight device of the present invention, the arithmetic control unit changes the flight status when the absolute value of the difference between the rotational speed of the first rotor-side power transmission unit and the rotational speed of the second rotor-side power transmission unit is more than or equal to a certain value.

The present invention is a method of controlling a flight device, the flight device includes: an airframe; a main rotor; an engine; an engine-side power transmission unit; a rotor-side power transmission unit; and a power connection/disconnection unit, the main rotor rotating to generate driving force necessary for the airframe to float, the engine generating power necessary for the main rotor to rotate, the engine-side power transmission unit rotating using the power of the engine, the rotor-side power transmission unit being drivingly connected to the main rotor; and the power connection/disconnection unit being provided between the engine-side power transmission unit and the rotor-side power transmission unit and transmitting the power from the engine-side power transmission unit to the rotor-side power transmission unit according to conditions, the method includes: changing a flight status when the degree to which the power connection/disconnection unit transmits the power differs from a predetermined value by a certain amount or more.

Advantageous Effects of Invention

A flight device of the present invention includes an airframe, a main rotor, an engine, an engine-side power transmission unit, a rotor-side power transmission unit, a power connection/disconnection unit, and an arithmetic control unit, in which the main rotor rotates to generate driving force necessary for the airframe to float, the engine generates power necessary for the main rotor to rotate, the engine-side power transmission unit rotates using the power of the engine, the rotor-side power transmission unit is drivingly connected to the main rotor, the power connection/disconnection unit is provided between the engine-side power transmission unit and the rotor-side power transmission unit and transmits the power from the engine-side power transmission unit to the rotor-side power transmission unit according to conditions, and the arithmetic control unit changes a flight status when the degree to which the power connection/disconnection unit transmits the power differs from a predetermined value by a certain amount or more. According to the flight device of the present invention, the arithmetic control unit changes the flight status when the degree to which the power connection/disconnection unit transmits power is not greater than a certain level, thus allowing the flight device to fly more safely.

Furthermore, a flight device of the present invention includes an airframe, a main rotor, an engine, an engine-side power transmission unit, a rotor-side power transmission unit, a power connection/disconnection unit, and an arithmetic control unit, in which the main rotor rotates to generate driving force necessary for the airframe to float and includes a first main rotor and a second main rotor, the engine generates power necessary for the first main rotor and the second main rotor to rotate, the engine-side power transmission unit rotates using the power of the engine and includes a first engine-side power transmission unit and a second engine-side power transmission unit, the rotor-side power transmission unit includes a first rotor-side power transmission unit drivingly connected to the first main rotor and a second rotor-side power transmission unit drivingly connected to the second main rotor, the power connection/disconnection unit transmits the power according to conditions and includes a first power connection/disconnection unit and a second power connection/disconnection unit, the first power connection/disconnection unit is provided between the first engine-side power transmission unit and the first rotor-side power transmission unit, the second power connection/disconnection unit is provided between the second engine-side power transmission unit and the second rotor-side power transmission unit, and the arithmetic control unit changes a flight status when the degree to which the first power connection/disconnection unit transmits the power and the degree to which the second power connection/disconnection unit transmits the power differ by a certain amount or more. According to the flight device of the present invention, the flight status is changed when the degree to which the first power connection/disconnection unit transmits power and the degree to which the second power connection/disconnection unit transmits power differ by a certain amount or more, thus allowing the flight device to fly more safely.

Still furthermore, the flight device of the present invention further includes: a first rotational speed measurement unit measuring rotational speed of the first rotor-side power transmission unit; and a second rotational speed measurement unit measuring rotational speed of the second rotor-side power transmission unit, in which the arithmetic control unit changes the flight status when the rotational speed of the first rotor-side power transmission unit measured by the first rotational speed measurement unit and the rotational speed of the second rotor-side power transmission unit measured by the second rotational speed measurement unit differ by a certain amount or more. According to the flight device of the present invention, the flight status is changed when the rotational speed of the first rotor-side power transmission unit and the rotational speed of the second rotor-side power transmission unit differ by a certain amount or more, thus allowing the flight device to fly more safely.

Still furthermore, in the flight device of the present invention, in a case of changing the flight status in a landing state, the arithmetic control unit stops the engine. According to the flight device of the present invention, in a process of changing the flight status in the landing state, the engine is stopped, thus preventing the flight device from flying in the condition where power transmission by the power connection/disconnection unit is not good.

Still furthermore, in the flight device of the present invention, in a case of changing the flight status in a flight state, the arithmetic control unit lands the flight device by using the driving force of the engine. According to the flight device of the present invention, even when a defect occurs in the power connection/disconnection unit in the flight state, the flight device is able to land by using the driving force of the engine.

Still furthermore, the flight device of the present invention further includes: a sub-rotor; and a motor that rotates the sub-rotor, in which in a case of changing the flight status in a flight state, the arithmetic control unit stops the engine and lands the flight device by rotating the sub-rotor using the motor. According to the flight device of the present invention, even when a defect occurs in the power connection/disconnection unit in the flight state, the flight device is able to land safely due to the sub-rotor.

Still furthermore, in the flight device of the present invention, in a case of flight from a landing state, the arithmetic control unit cancels the flight when the difference between the degree to which the first power connection/disconnection unit transmits the power and the degree to which the second power connection/disconnection unit transmits the power is greater than a first setting value. According to the flight device of the present invention, a defect in the power connection/disconnection unit is determined based on the first setting value, and the flight itself of the flight device is canceled. It is therefore possible to prevent unstable flight of the flight device.

Still furthermore, in the flight device of the present invention, during flight, the arithmetic control unit lands the flight device while running the engine when the difference between the degree to which the first power connection/disconnection unit transmits the power and the degree to which the second power connection/disconnection unit transmits the power is greater than a second setting value. According to the flight device of the present invention, a defect in the power connection/disconnection unit is determined based on the second setting value, and the flight device is landed with the engine running. It is therefore possible to stably execute landing operation of the flight device when a defect occurs.

Still furthermore, in the flight device of the present invention, during flight, the arithmetic control unit lands the flight device with the engine stopped when the difference between the degree to which the first power connection/disconnection unit transmits the power and the degree to which the second power connection/disconnection unit transmits the power is greater than a third setting value. According to the flight device of the present invention, a defect in the power connection/disconnection unit is determined based on the third setting value, and the flight device is landed after the engine is stopped. It is therefore possible to more stably execute landing operation of the flight device.

Still furthermore, in the flight device of the present invention, the arithmetic control unit changes the flight status when the absolute value of the difference between the rotational speed of the first rotor-side power transmission unit and the rotational speed of the second rotor-side power transmission unit is more than or equal to a certain value. According to the flight device of the present invention, in a case where it is difficult to stabilize the flight state, the flight status is changed, and the flight device can thereby be operated more safely.

The present invention is a method of controlling a flight device, the flight device including an airframe, a main rotor, an engine, an engine-side power transmission unit, a rotor-side power transmission unit, and a power connection/disconnection unit, the main rotor rotating to generate driving force necessary for the airframe to float, the engine generating power necessary for the main rotor to rotate, the engine-side power transmission unit rotating using the power of the engine, the rotor-side power transmission unit being drivingly connected to the main rotor; and the power connection/disconnection unit being provided between the engine-side power transmission unit and the rotor-side power transmission unit and transmitting the power from the engine-side power transmission unit to the rotor-side power transmission unit according to conditions, the method including: changing a flight status when the degree to which the power connection/disconnection unit transmits the power differs from a predetermined value by a certain amount or more. According to the flight device control method of the present invention, the arithmetic control unit changes the flight status when the degree to which the power connection/disconnection unit transmits power is not greater than a certain level, thus allowing the flight device to fly more safely.

DESCRIPTION OF EMBODIMENTS

Figure 1:
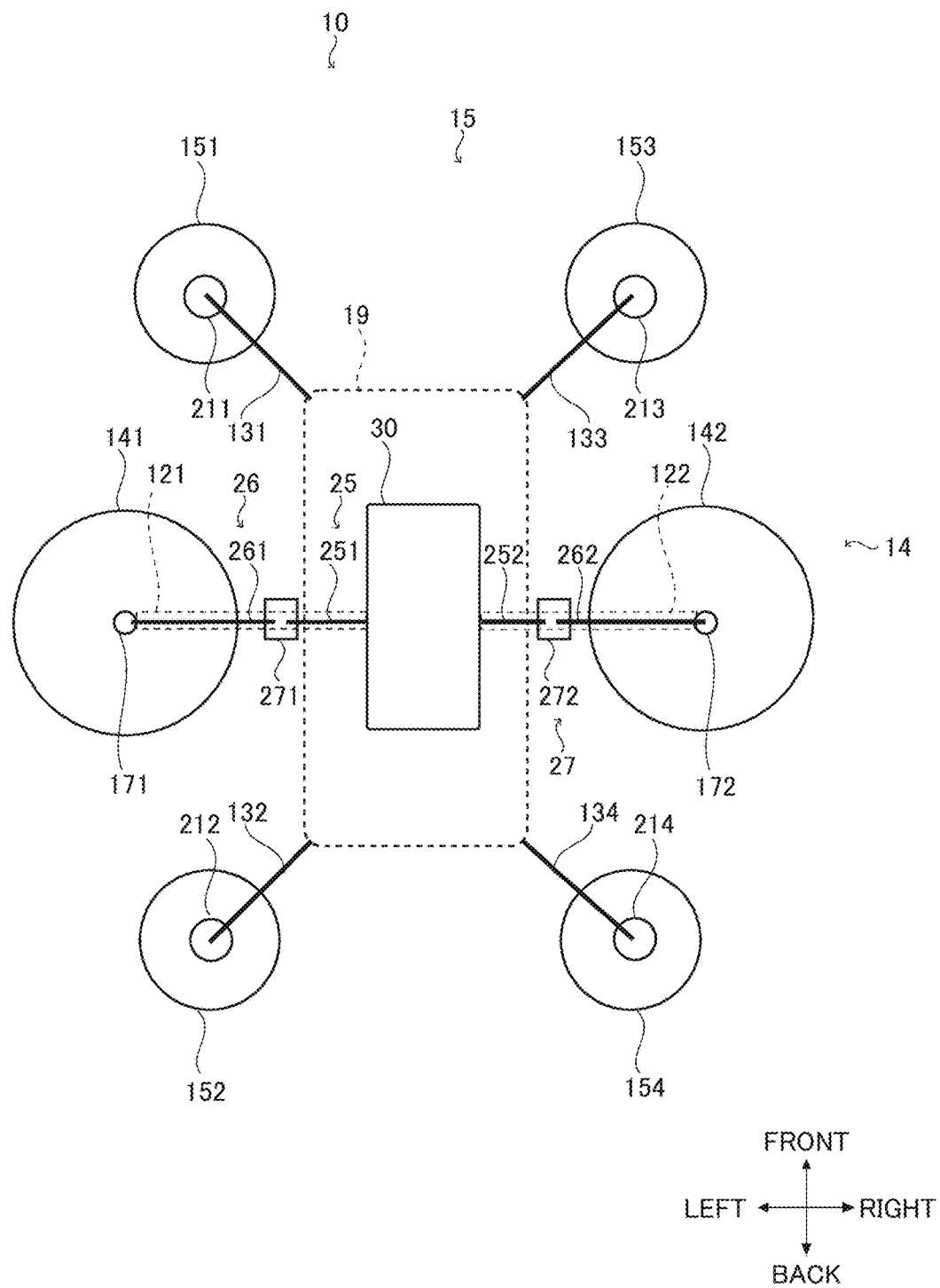
FIG. 1 is a schematic diagram illustrating a flight device according to an embodiment of the present invention.

Hereinafter, the configuration of a flight device of an embodiment will be described with reference to the drawings. In the following description, portions having the same configurations are denoted by the same reference numerals, and the description thereof will not be repeated. The following description will use up, down, front, back, right, and left directions, but these directions are for convenience of explanation. A flight device 10 is also called a drone and specifically also called a parallel-type hybrid drone.

FIG. 1 is a schematic diagram illustrating the flight device 10.

The flight device 10 mainly includes an airframe 19, main rotors 14, an engine 30, engine-side power transmission units 25, rotor-side power transmission units 26, power connection/disconnection units 27, and an arithmetic control unit 31. The flight device 10 is a parallel-type hybrid drone including two driving systems in parallel, an electric driving system and a mechanical driving system. The electric driving system rotates motors 21 and sub-rotors 15, which will be described later. The mechanical driving system rotates the main rotors 14, which will be described later.

The airframe 19 is a body supporting the units constituting the fright device 10 and is made of synthetic resin, metal, or a composite material thereof.

The main rotors 14 rotate to generate driving force necessary for the airframe 19 to float and includes a first main rotor 141 and a second main rotor 142. The first main rotor 141 is arranged to the left of the airframe 19. The second main rotor 142 is arranged to the right of the airframe 19. Herein, the first main rotor 141 and the second main rotor 142 rotate in opposite directions at the same rotational speed. The first main rotor 141 is connected to the engine 30 so as to be driven, with a first engine-side power transmission unit 251, a first power connection/disconnection unit 271, and a first rotor-side power transmission unit 261 interposed therebetween. The second main rotor 142 is connected to the engine 30 so as to be driven, with a second engine-side power transmission unit 252, a second power connection/disconnection unit 272, and a second rotor-side power transmission unit 262 interposed therebetween.

The engine 30 generates power necessary for the first main rotor 141 and the second main rotor 142 to rotate. The engine 30 is incorporated in the airframe 19 and rotates the first main rotor 141 and the second main rotor 142 at a predetermined rotational speed. The engine 30 includes a first engine unit 40 and a second engine unit 41 as will be described later with reference to FIG. 3.

The engine-side power transmission units 25 are, for example, a steel rod and rotate using the power of the engine 30. The engine-side power transmission units 25 include the first engine-side power transmission unit 251 and the second engine-side power transmission unit 252. The first engine-side power transmission unit 251 and the second engine-side power transmission unit 252 are connected to crankshafts of the engine 30 so as to be driven. The first engine-side power transmission unit 251 protrudes from the engine 30 to the left. The second engine-side power transmission unit 252 protrudes from the engine 30 to the right.

The rotor-side power transmission units 26 are, for example, a steel rod. The rotor-side power transmission units 26 include the first rotor-side power transmission unit 261, which is drivingly connected to the first main rotor 141, and the second rotor-side transmission unit 262, which is drivingly connected to the second main rotor 142. The first rotor-side power transmission unit 261 and the first main rotor 141 are drivingly connected with a gear 171 interposed therebetween. In a similar manner, the second rotor-side power transmission unit 262 and the second main rotor 142 are drivingly connected with a gear 172 interposed therebetween.

The power connection/disconnection units 27 are constituent units that transmit power according to conditions and are, for example, a clutch. The power connection/disconnection units 27 are a centrifugal clutch by way of example. The power connection/disconnection units 27 include the first power connection/disconnection unit 271 and the second power connection/disconnection unit 272. The centrifugal clutch is also referred to as a centrifugal type clutch.

The first power connection/disconnection unit 271 is provided between the first engine-side power transmission unit 251 and the first rotor-side power transmission unit 261. When the engine 30 is stopped and the first engine-side power transmission unit 251 does not rotate or when the rotational speed of the first engine-side power transmission unit 251 rotated by the engine 30 is lower than a certain level, the first power connection/disconnection unit 271 does not transmit power. On the other hand, when the rotational speed of the first engine-side power transmission unit 251 is not lower than the certain level, the first power connection/disconnection unit 271 transmits power from the first engine-side power transmission unit 251 to the first rotor-side power transmission unit 261. The power generated by the engine 30 is thereby transmitted to the first engine-side power transmission unit 251, the first power connection/disconnection unit 271, and the first rotor-side power transmission unit 261, so that the first main rotor 141 rotates.

The configuration and operation of the second power connection/disconnection unit 272 are the same as those of the first power connection/disconnection unit 271. Specifically, the second power connection/disconnection unit 272 is provided between the second engine-side power transmission unit 252 and the second rotor-side power transmission unit 262. When the engine 30 is stopped and the second engine-side power transmission unit 252 does not rotate or when the rotational speed of the second engine-side power transmission unit 252 rotated by the engine 30 is lower than the certain level, the second power connection/disconnection unit 272 does not transmit power. On the other hand, when the rotational speed of the second engine-side power transmission unit 252 is not lower than the certain level, the second power connection/disconnection unit 272 transmits power from the second engine-side power transmission unit 252 to the second rotor-side power transmission unit 262. The power generated by the engine 30 is thereby transmitted to the second engine-side power transmission unit 252, the second power connection/disconnection unit 272, and the second rotor-side power transmission unit 262, so that the second main rotor 142 rotates.

A first main frame 121 extends to the left from the airframe 19. The first engine-side power transmission unit 251 and the first rotor-side power transmission unit 261, which are described above, are incorporated in the first main frame 121, which is tubular, for example. The first power connection/disconnection unit 271 is provided in the middle of the first main frame 121.

A second main frame 122 extends to the right from the airframe 19. The second engine-side power transmission unit 252 and the second rotor-side power transmission unit 262, which are described above, are incorporated in the second main frame 122. The second power connection/disconnection unit 272 is provided in the middle of the second main frame 122.

The flight device 10 includes sub-rotors 15. The sub-rotors 15 include sub-rotors 151 to 154. The sub-rotors 15 rotate to control the overall position and orientation of the flight device 10.

The sub-rotor 151 is positioned at the front left of the airframe 19. The sub-rotor 151 is connected to the airframe 19 through a sub-frame 131 and is rotated by a motor 211.

The sub-rotor 152 is positioned at the back left of the airframe 19. The sub-rotor 152 is connected to the airframe 19 through a sub-frame 132 and is rotated by a motor 212.

The sub-rotor 153 is positioned at the front right of the airframe 19. The sub-rotor 153 is connected to the airframe 19 through a sub-frame 133 and is rotated by a motor 213.

The sub-rotor 154 is positioned at the back right of the airframe 19. The sub-rotor 154 is connected to the airframe 19 through a sub-frame 134 and is rotated by a motor 214.

The behavior of the power connection/disconnection units 27 will be described. The power connection/disconnection units 27, which are, for example, a centrifugal clutch, has a function of transmitting power when the rotational speed is not lower than a certain level. However, the power connection/disconnection units 27 are a complicated mechanical mechanism, and the components constituting the power connection/disconnection units 27 have a certain level of tolerance. The first power connection/disconnection unit 271 and the second power connection/disconnection unit 272 may therefore behave slightly differently. For example, when the rotational speeds of the first engine-side power transmission unit 251 and the second engine-side power transmission unit 252 reach a predetermined speed, the first power connection/disconnection unit 271 transmits power to the first rotor-side power transmission unit 261 while the second power connection/disconnection unit 272 does not transmit power to the second rotor-side power transmission unit 262. In this case, although the first main rotor 141 is rotating, the second main rotor 142 does not rotate, so that the flight device 10 may be unable to take off stably. There is a similar risk when any one of the first power connection/disconnection unit 271 or the second power connection/disconnection unit 272 mechanically fails. In the flight device 10 of the embodiment, therefore, the operation of the flight device 10 is controlled based on the rotational speeds of the first engine-side power transmission unit 251 and the second engine-side power transmission unit 252. This matter will be described later with reference to FIG. 4.

Figure 2:
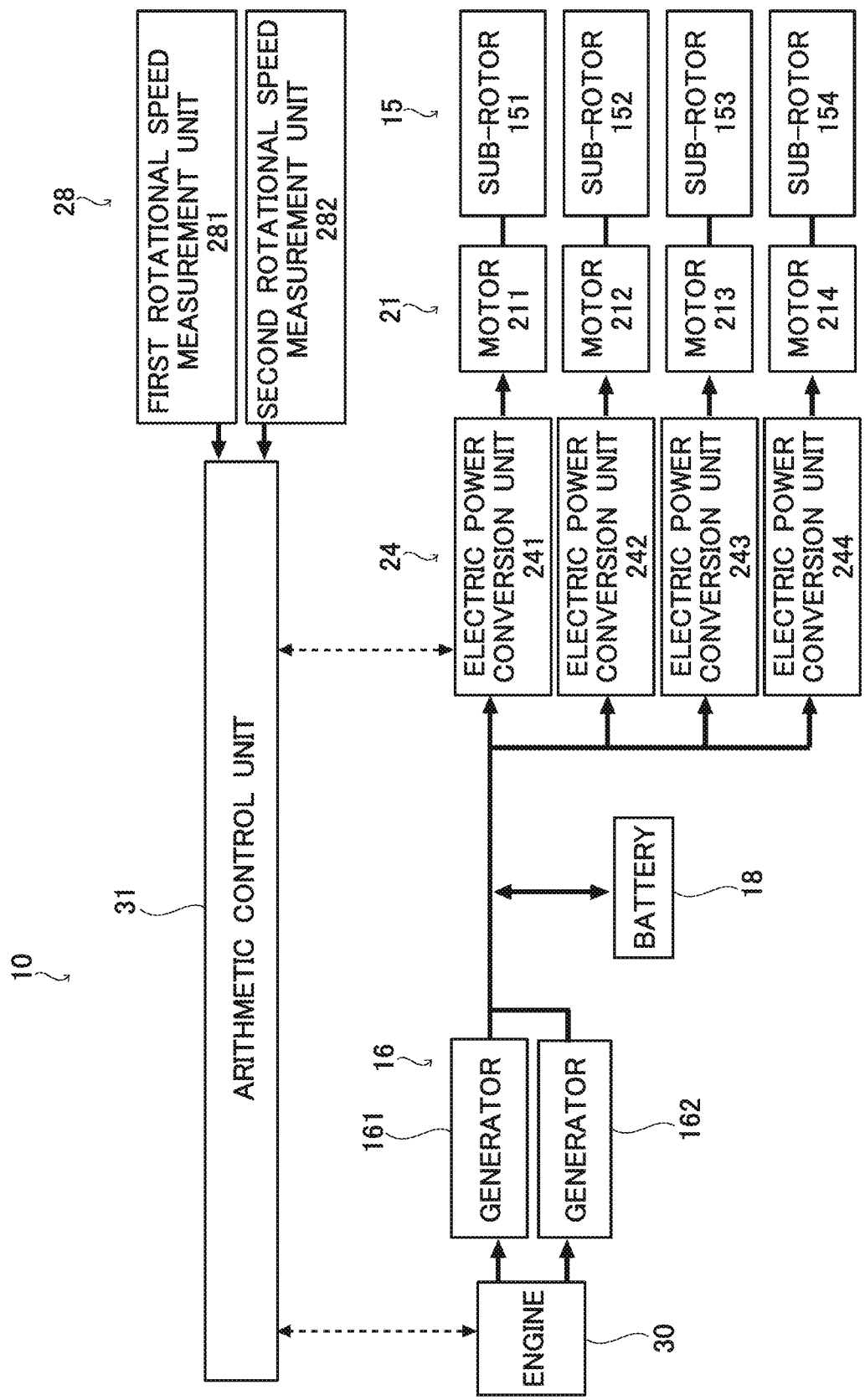
FIG. 2 is a diagram illustrating the flight device according to the embodiment of the present invention, which is a block diagram illustrating the connection configuration of each portion.

FIG. 2 is a diagram illustrating the flight device 10 and is a block diagram illustrating the connection configuration of each portion.

The flight device 10 includes the arithmetic control unit 31, the engine 30, generators 16, a battery 18, electric power conversion units 24, the motors 21, the sub-rotors 15, and a rotational speed measurement unit 28.

The arithmetic control unit 31 includes a CPU, a ROM, a RAM, and the like. The arithmetic control unit 31 controls the behavior of each unit constituting the flight device 10 based on inputs from various sensors and a controller not illustrated herein. The arithmetic control unit 31 serves as a flight controller that controls the rotational speed of the main rotors 14 and sub-rotors 15 based on inputs from various sensors.

The engine 30 operates based on input signals from the arithmetic control unit 31 and generates energy necessary for the flight device 10 to fly. The specific configuration of the engine 30 will be described later with reference to a drawing.

The generators 16 are units that generate electric power by using a part of the driving force of the engine 30 and include generators 161 and 162. The generator 161 is driven by the first engine unit 40 of the engine 30, which will be described later. The generator 162 is driven by the second engine unit 41 of the engine 30, which will be described later.

The battery 18 is interposed between the generators 16 and the electric power conversion units 24. The battery 18 is charged by the generators 16. The electric power discharged from the battery 18 is supplied to the electric power conversion units 24, which will be described later.

The electric power conversion units 24 are provided corresponding to the respective sub-rotors 15. Each power conversion unit 24 can be composed of a converter and an inverter to once convert alternating-current power supplied from the generator 162 into direct-current power and then convert the direct-current power into alternating-current power with a predetermined frequency. Each electric power conversion unit 24 also can be composed of an inverter to convert direct-current power supplied from the battery 18 into alternating-current power with a predetermined frequency. Specifically, the electric power conversion units 24 include electric power conversion units 241, 242, 243, and 244.

The motors 21 are provided corresponding to the respective sub-rotors 15. The motors 21 include motors 211, 212, 213, and 214. The motors 211, 212, 213, and 214 rotate at a predetermined speed using electric power supplied from the electric power conversion units 241 to 244, respectively.

The sub-rotors 15 include the sub-rotors 151 to 154 as described above. The sub-rotors 151 to 154 are rotated by the motors 211 to 214, respectively.

The rotational speed measurement unit 28 measures the rotational speed of the engine-side power transmission units 25, which is illustrated in FIG. 1, and input an electric signal representing the measured rotational speed to the arithmetic control unit 31. The rotational speed measurement unit 28 includes a first rotational speed measurement unit 281 and a second rotational speed measurement unit 282. The first rotational speed measurement unit 281 measures the rotational speed of the first rotor-side power transmission unit 261. The second rotational speed measurement unit 282 measures the rotational speed of the second rotor-side power transmission unit 262. As will be described later, the arithmetic control unit 31 changes the flight status when the rotational speed of the first rotor-side power transmission unit 261 measured by the first rotational speed measurement unit 281 and the rotational speed of the second rotor-side power transmission unit 262 measured by the second rotational speed measurement unit 282 differ by a certain amount or more. Herein, changing the flight status is, for example stopping the flight device 10 from taking off, urgently landing the flight device 10 flying normally, and other operations.

The flight status of the flight device 10 will be briefly described. The flight device 10 is operated in a landing state, a takeoff state, a hovering state, an ascending-descending state, a horizontal movement state, and an emergency flight state.

In the landing state, the flight device 10 is in contact with the ground. In this state, the engine 30 is not running, and the engine-side power transmission units 25 do not rotate. The power connection/disconnection units 27 are in a disconnected state, and the rotor-side power transmission units 26 and the main rotors 14 do not rotate.

In the takeoff state, the flight device 10 is rising away from the contact surface mainly due to the thrust generated by rotation of the main rotors 14.

In the hovering state, based on an instruction from the arithmetic control unit 31, the main rotors 14 are rotated using the driving force generated by the engine 30 to keep the flight device 10 floating at a predetermined position in the air. In this process, the sub-rotors 15 are rotating based on an instruction from the arithmetic control unit 31. The arithmetic control unit 31 controls the electric power conversion units 24 to set the rotational speeds of the motors 21 and sub-rotors 15 to predetermined values so that the flight device 10 can maintain its predetermined altitude and orientation.

In the ascending-descending state, the flight device 10 is raised or lowered by controlling the rotational speed of the engine 30. In this process as well, the arithmetic control unit 31 controls the electric power conversion units 24 to set the rotational speeds of the motors 21 and sub-rotors 15 to predetermined values so that the flight device 10 can maintain its predetermined altitude and orientation.

In the horizontal movement state, the arithmetic control unit 31 controls the electric power conversion units 24 to control the rotational speeds of the motors 21 and sub-rotors 15 so that the flight device 10 be tilted. In this process as well, the arithmetic control unit 31 controls the running state of the engine 30 to rotate the main rotors 14 at a predetermined speed.

In the emergency flight state, the arithmetic control unit 31 forces the flight device 10 that is flying to land. As will be described later, the emergency flight state is activated when the rotational speed measured in the first rotational speed measurement unit 281 and the rotational speed measured in the second rotational speed measurement unit 282 differ by a certain amount or more.

Figure 3:
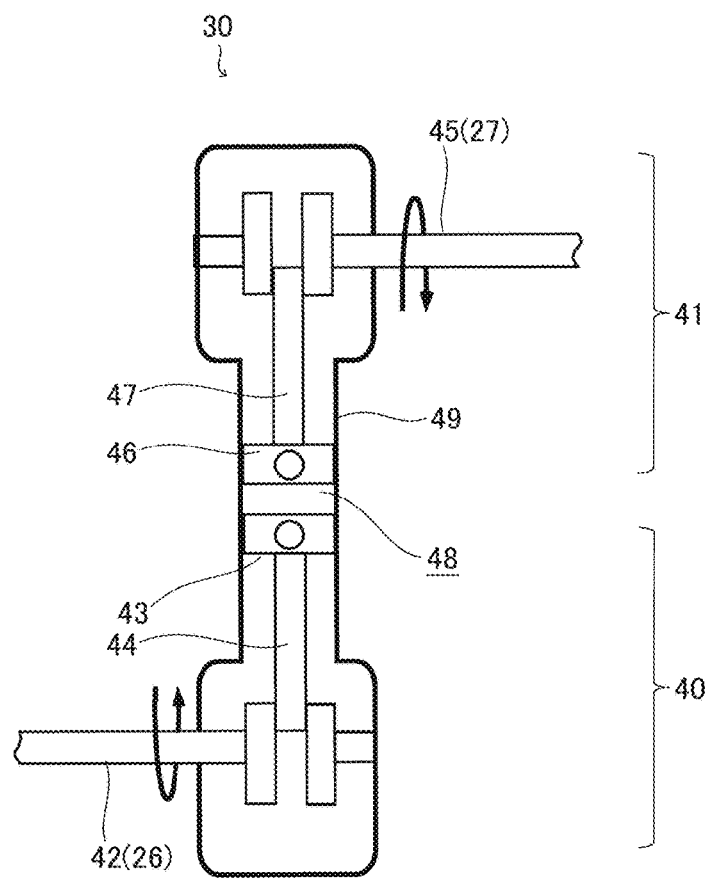
FIG. 3 is a diagram illustrating the configuration of an engine of the flight device according to the embodiment of the present invention.

FIG. 3 is a diagram illustrating the configuration and arrangement of the engine 30 of the flight device 10.

The engine 30 includes the first engine unit 40 and the second engine unit 41. The first engine unit 40 and the second engine unit 41 are positioned opposite to each other. The first engine unit 40 is positioned in the back left while the second engine unit 41 is positioned in the front right.

The first engine unit 40 includes: a first piston 43, which reciprocates; a first crankshaft 42, which converts reciprocating motion of the first piston 43 into rotational motion; and a first connecting rod 44, which rotatably couples the first piston 43 to the first crankshaft 42.

The second engine unit 41 includes: a second piston 46, which reciprocates; a second crankshaft 45, which converts reciprocating motion of the second piston 46 into rotational motion; and a second connecting rod 47, which rotatably couples the second piston 46 to the second crankshaft 45.

The first piston 43 of the first engine unit 40 and the second piston 46 of the second engine unit 41 share a combustion chamber 48. In other words, the first piston 43 and the second piston 46 reciprocate within a single continuing cylinder 49. By causing the first engine unit 40 and the first piston 43 to simultaneously make stroke toward the center, it is possible to achieve a high expansion ratio of gas mixture in the combustion chamber 48 while reducing the stroke amount.

The engine 30 includes a volume space (not illustrated herein) communicating with the combustion chamber 48. In the volume space, a spark plug is arranged. In the combustion chamber 48, an intake port and an exhaust port, which are not illustrated herein, are formed. An air-mixture containing fuel, such as gasoline, is introduced into the combustion chamber 48 through the intake port, and exhaust gas after combustion is discharged from the combustion chamber 48 to the outside through the exhaust port.

The engine 30 configured as described above operates as follows. First, in an intake stroke, the first piston 43 and the second piston 46 move outward from the center within the cylinder 49, to introduce air mixture, as a mixture of air and fuel, into the cylinder 49. Next, in a compression stroke, the first piston 43 and the second piston 46 are forced toward the center due to inertia of the first and second crankshafts 42 and 46 that are rotating, and the air mixture is compressed within the cylinder 49. Then, in a combustion stroke, the not-illustrated spark plug ignites in the combustion chamber 48, and the air mixture burns within the cylinder 49. The first piston 43 and the second piston 46 are thereby forced to the respective outer ends, which are bottom dead centers. Then, in an exhaust stroke, the first piston 43 and the second piston 46 are forced inward due to inertia of the first and second crankshafts 42 and 46 that are rotating. The gas remaining within the cylinder 49 after combustion is discharged to the outside.

In the engine 30, the two first and second pistons 43 and 46, which reciprocate within the single cylinder 49, can share strokes. Compared to typical gasoline engines, therefore, the compression ratio of gas mixture can be increased. Since the first piston 43 and the second piston 46 face each other within the cylinder 49, the engine 30 does not need a cylinder head that is necessary for general engines. The engine 30 therefore has a simple structure and light weight. The members constituting the engine 30, that is, the first and second pistons 43 and 46, the first and second crankshafts 42 and 45, or the like are positioned opposite to each other and operate in opposite manners. Vibrations generated from the members of the engine 30 are thereby canceled each other, so that vibrations generated by the entire engine 30 and transmitted to the outside can be reduced. By mounting the thus-configured engine 30 on the flight device 10, the flight device 10 can be reduced in size, weight, and vibrations. Due to the reduction in vibrations in particular, it is possible to prevent delicate equipment, such as arithmetic control devices and GPS sensors, from being adversely affected by orientation control or motor output control. Furthermore, it is possible to prevent parcels being transported by the flight device 10 from being damaged by vibrations.

The engine 30 is provided with an inverse rotation synchronization mechanism not illustrated herein. The inverse rotation synchronization mechanism causes the first crankshaft 42 and the second crankshaft 45 to rotate in opposite directions. Furthermore, the inverse rotation synchronization mechanism synchronizes reciprocating motions of the first piston 43 and the second piston 46. In the engine 30, therefore, the first crankshaft 42 and the second crankshaft 45 rotate in opposite directions in principle. The first engine-side power transmission unit 251, which is connected to the first crankshaft 42 so as to be driven, and the second engine-side power transmission unit 252, which is connected to the second crankshaft 45 so as to be driven, therefore rotate in opposite directions without a special reversing mechanism. The first main rotor 141 and the second main rotor 142, which are illustrated in FIG. 1, therefore rotate in opposite directions at the same rotational speed without any special reversing mechanism.

Figure 4:
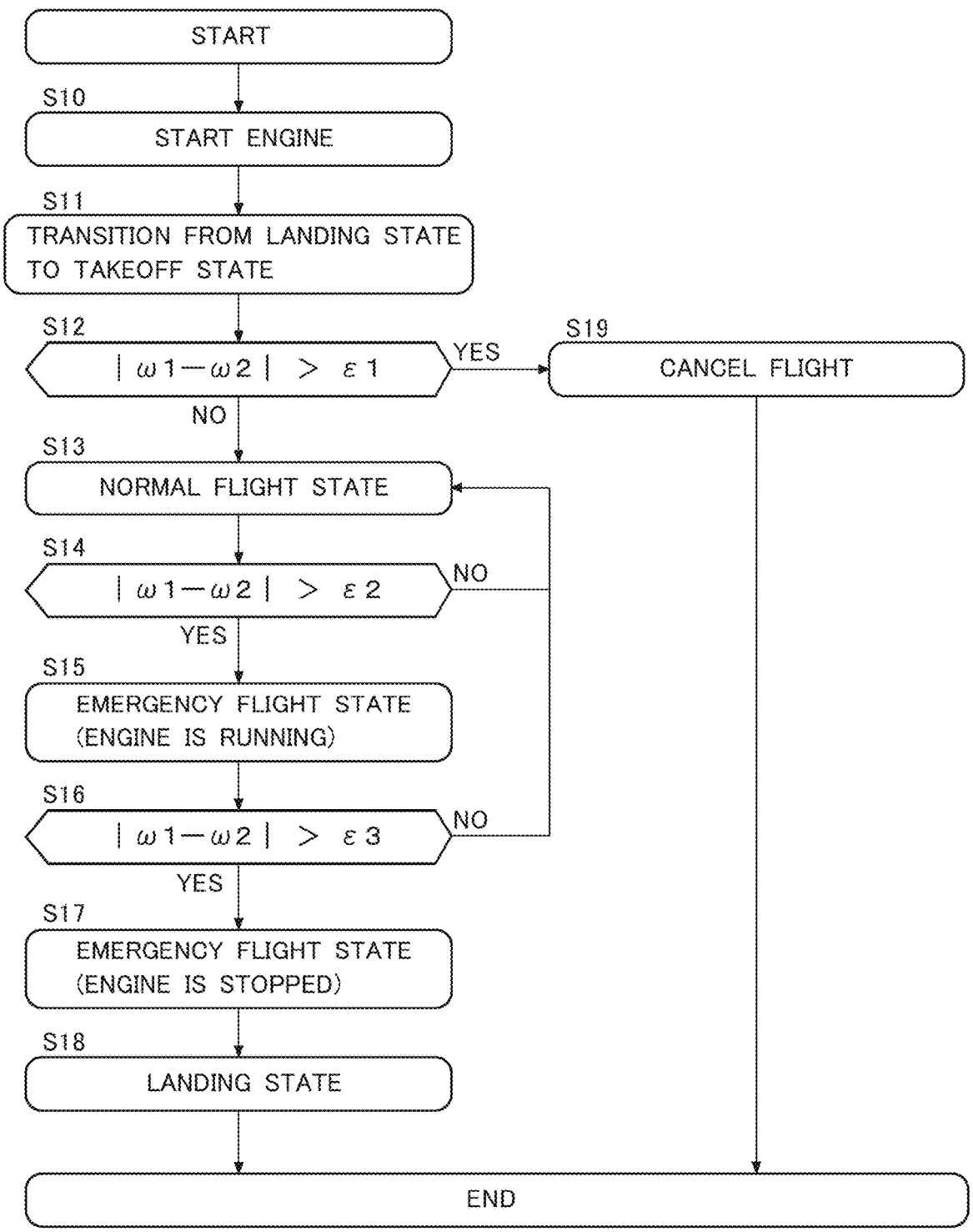
FIG. 4 is a flowchart illustrating a control method of the flight device according to the embodiment of the present invention.

A method of controlling the operation of the flight device 10 configured as described above will be described with reference to the flowchart of FIG. 4.

In step S10, the arithmetic control unit 31 starts the engine 30 based on an operator's instruction through the controller. The first engine-side power transmission unit 251 and the second engine-side power transmission unit 252 are thereby rotated using the driving force of the engine 30. In this process, the flight device 10 is placed on a contact surface, which is the ground, for example.

In step S11, the arithmetic control unit 31 transitions from the landing state to the takeoff state. Herein, the landing state refers to a state where the flight device 10 is in contact with the ground. The takeoff state refers to a state where the flight device 10 is rising from the landing state and lifting off from the ground.

In this step S11, specifically, when the rotational speed of the first engine-side power transmission unit 251 reaches a predetermined rotational speed, the first power connection/disconnection unit 271 enters a connected state, and the first engine-side power transmission unit 251, the first rotor-side power transmission unit 261, and the first main rotor 141 rotate. In a similar manner, when the rotational speed of the second engine-side power transmission unit 252 reaches a predetermined rotational speed, the second power connection/disconnection unit 272 enters a connected state, and the second engine-side power transmission unit 252, the second rotor-side power transmission unit 262, and the second main rotor 142 rotate. In this process, as described above, an event in which one of the first power connection/disconnection units 271 or the second power connection/disconnection unit 272 transmits power while the other does not may occur due to machining tolerances of the components constituting the first and second power connection/disconnection units 271 and 272 or other factors. A similar event may occur even when the first power connection/disconnection unit 271 or the second power connection/disconnection unit 272 mechanically fails. If step S11 is continued in this condition, the flight device 10 may lose its balance and may be unable to stably transition to the takeoff state. In this embodiment, therefore, the flight is cancelled depending on the condition of the first power connection/disconnection unit 271 or the second power connection/disconnection unit 272 as will be described later.

In step S12, the arithmetic control unit 31 checks the difference in rotational speed between the first rotor-side power transmission unit 261 and the second rotor-side power transmission unit 262. Specifically, the arithmetic control unit 31 determines whether the absolute value of the difference between $\omega 1$ and $\omega 2$ is greater than $\varepsilon 1$ where $\omega 1$ is the rotational speed of the first rotor-side power transmission unit 261, $\varepsilon 2$ is the rotational speed of the second rotor-side power transmission unit 262, and $\varepsilon 1$ is a predetermined allowable speed difference.

If the determination in step S12 is YES, that is, if the absolute value of the difference between $\omega 1$ and $\omega 2$ is greater than $\varepsilon 1$ (a first setting value), the arithmetic control unit 31 goes to step S19. In this case, there is a great difference between the degree to which the first power connection/disconnection unit 271 transmits power and the degree to which the second power connection/disconnection unit 272 transmits power. If the landing operation is continued in this condition, it is not easy to fly the flight device 10 safely. Therefore, the arithmetic control unit 31 of the flight device 10 determines that the degree to which the first power connection/disconnection unit 271 transmits power and the degree to which the second power connection/disconnection unit 272 transmits power differ by a certain amount or more and changes the flight status.

If the determination in step S12 is NO, that is, if the absolute value of the difference between $\omega 1$ and $\omega 2$ is not greater than $\varepsilon 1$, the arithmetic control unit 31 goes to step S13. Specifically, the degree to which the first power connection/disconnection unit 271 transmits power and the degree to which the second power connection/disconnection unit 272 transmits power do not differ greatly. Therefore, the arithmetic control unit 31 goes to a step of performing flight.

In step S13, the calculation control unit 31 activates a normal flight state. Specifically, the calculation control unit 31 causes the first power connection/disconnection unit 271 to enter the connected state to rotate the first engine-side power transmission unit 251, the first rotor-side power transmission unit 261, and the first main rotor 141 using the power generated by the engine 30. In a similar manner, the calculation control unit 31 causes the second power connection/disconnection unit 272 to enter the connected state to rotate the second engine-side power transmission unit 252, the second rotor-side power transmission unit 262, and the second main rotor 142 using the power generated by the engine 30. Rotating the first main rotor 141 and the second main rotor 142 produces the lift necessary for the flight device 10 to float. Furthermore, rotating the sub-rotors 151 to 154 enables the flight device 10 to assume its predetermined position and orientation. Herein, the normal flight state includes the aforementioned takeoff state, hovering state, ascending-descending state, horizontal movement state, and the like.

In step S14, in the normal flight state, the arithmetic control unit 31 checks the difference in rotational speed between the first rotor-side power transmission unit 261 and the second rotor-side power transmission unit 262. Specifically, the arithmetic control unit 31 determines whether the absolute value of the difference between $\omega 1$ and $\omega 2$ is greater than $\varepsilon 2$ (a second setting value), which is a predetermined allowable speed difference. Herein, $\varepsilon 2$ may be the same value as $\varepsilon 1$ or may be a different value. For example, $\varepsilon 2$ is set to such a value that a significant difference is observed between the rotational speeds $\omega 1$ and $\omega 2$ but the flight with the engine 30 running can be continued.

If the determination in step S14 is YES, that is, if the absolute value of the difference between $\omega 1$ and $\omega 2$ is greater than $\varepsilon 2$, the arithmetic control unit 31 goes to step S15.

If the determination in step S14 is NO, that is, if the absolute value of the difference between $\omega 1$ and $\omega 2$ is not greater than 2, the arithmetic control unit 31 returns to step S13 and measures the normal flight state. In this case, during flight, the first power connection/disconnection unit 271 and the second power connection/disconnection unit 272 transmit power to substantially the same extent. The flight device 10 is therefore able to continue safely flying.

In step S15, the arithmetic control unit 31 activates the emergency flight state as an example of the change in flight status. Specifically, the arithmetic control unit 31 runs the engine 30 to rotate the first main rotor 141 and the second main rotor 142 using the power generated by the engine 30 while executing a lowering operation to land the flight device 10. In this process, the first power connection/disconnection unit 271 and the second power connection/disconnection unit 272 are in the connected state. The flight device 10 is thereby able to land before any one of the first power connection/disconnection unit 271 or the second power connection/disconnection unit 272 significantly fails, thus ensuring the safety of the flight device 10 during flight.

In step S16, the arithmetic control unit 31 determines during flight whether the absolute value of the difference between 1 and $\omega 2$ is greater than $\varepsilon 3$ (a third setting value), which is a predetermined allowable speed difference. Herein, $\varepsilon 3$ is a value greater than $\varepsilon 2$. When the absolute value of the difference between $\omega 1$ and $\omega 2$ is greater than $\varepsilon 3$, it is difficult to continue the flight of the flight device 10 using the thrust of the main rotor 14

If the determination in step S16 is YES, that is, if the absolute value of the difference between ω1 and ω2 is greater than ε3, the arithmetic control unit 31 goes to step S17.

If the determination in step S16 is NO, that is, if the absolute value of the difference between ω1 and ω2 is not greater than ε3, the arithmetic control unit 31 returns to step S13 and measures the normal flight state. In this case, the flight device 10 is able to continue safely flying. Alternatively, the arithmetic control unit 31 may return to step S15 and land the flight device 10 using the thrust of the main rotor 14.

In step S17, the arithmetic control unit 31 firstly stops the engine 30 as an example of the change in flight status. This is because the first main rotor 141 and the second main rotor 142 greatly differ in rotational speed herein and if the rotation of the first main rotor 141 and the second main rotor 142 is continued, it is difficult to fly the flight device 10 stably. Furthermore, the arithmetic control unit 31 urgently lands the flight device 10 using the thrust of only the sub-rotors 15. In this process, the arithmetic control unit 31 can make settings such that the thrust of the sub-rotors 15 is greater than that in the normal flight state.

In step S18, the flight device 10 is landed. Specifically, using the thrust of only the main rotors 14 or the thrust of both the main rotors 14 and the sub-rotors 15, the arithmetic control unit 31 lowers the flight device 10 until the flight device 10 comes into contact with the ground. In this process, the arithmetic control unit 31 may inform the operator through the controller that the flight device 10 will make emergency landing.

In step S19, the arithmetic control unit 31 cancels the flight as an example of the change in flight state. In this case, there is a great difference between the degree to which the first power connection/disconnection unit 271 transmits power and the degree to which the second power connection/disconnection unit 272 transmits power, and if the landing operation is continued in this condition, it is difficult to fly the flight device 10 safely. Therefore, the arithmetic control unit 31 stops the engine 30, that is, does not allow the flight device 10 to take off and informs the operator through the controller or the like that the flight is difficult.

This concludes the description concerning the operation of the flight device 10.

Figure 5:
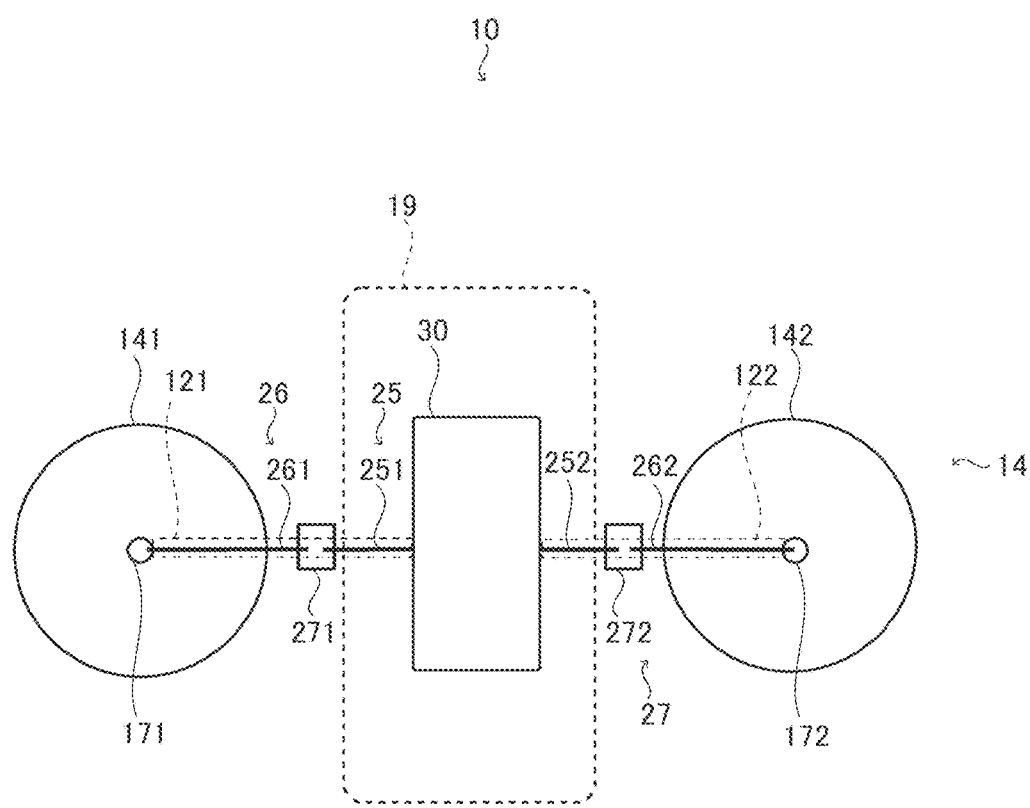
FIG. 5 is a schematic diagram illustrating a flight device according to another mode of the present invention.

FIG. 5 is a schematic diagram illustrating the flight device 10 according to another mode. The basic configuration of the flight device 10 illustrated in FIG. 5 is substantially the same as that of the flight device 10 illustrated in FIG. 1 and is different in not including the sub-rotors 15. In other words, the flight device 10 illustrated in FIG. 5 is an engine-type drone including the main rotors 14 mechanically rotating using the driving force of the engine 30, but not including the sub-rotors 15.

The flight device 10 includes only the main rotors 14 as the mechanism for causing the airframe 19 to float. The main rotors 14 generate the thrust necessary for the airframe 19 to float in the air and furthermore controls the position and orientation of the flight device 10. Specifically, the main rotors 14 include a control mechanism that controls the position and orientation of the flight device 10. Such a control mechanism can be, for example, a pitch control that properly changes the pitch angle of the blades of the main rotor 14.

Even when not including the sub-rotors 15, the flight device 10 is able to activate the hovering state, the ascending state, the descending state, and the horizontal movement state due to the control mechanism of the main rotor 14.

The embodiments described above can mainly provide the following effects.

With reference to FIG. 1, when the degree to which the power connection/disconnection units 27 transmit power is not greater than a certain level, the flight status is changed, thus improving the safety of the flight device 10.

Furthermore, when the degree to which the first power connection/disconnection unit 271 transmits power and the degree to which the second power connection/disconnection unit 272 transmits power differ by a certain amount or more, the flight status is changed, thus further improving the safety of the flight device 10.

Still furthermore, when the first rotor-side power transmission unit 261 and the second rotor-side power transmission unit 262 differ in rotational speed by a certain amount or more, the flight status is changed, thus allowing the flight device 10 to fly more safely.

Still furthermore, in the case of changing the flight status in the landing state, the engine 30 is stopped, thus preventing the flight device 10 from flying in the condition where the power transmission by the power connection/disconnection units 27 is not good.

Still furthermore, even if a defect occurs in the power connection/disconnection units 27 in the flight state, the flight device 10 is able to land by using the driving force of the engine 30.

Still furthermore, even if a defect occurs in the power connection/disconnection units 27 in the flight state, the flight device 10 is able to land safely due to the sub-rotors 15.

Hereinabove, the embodiment of the present invention is described. However, the present invention is not limited to the aforementioned embodiment and can be changed without departing from the spirit of the present invention. Furthermore, the aforementioned modes can be properly combined.

With reference to FIG. 3, in the engine 30, the first engine unit 40 and the second engine unit 41 share the combustion chamber 48. However, the first engine unit 40 and the second engine unit 41 may be configured to include individual combustion chambers.

With reference to FIG. 3, the engine 30 includes the first engine unit 40 and the second engine unit 41. However, the engine 30 may be composed of only the first engine unit 40. In this case, the power from the first engine unit 40 is transmitted to the first engine-side power transmission unit 251 and the second engine-side transmission unit 252 through a gear.

With reference to FIGS. 1 and 3, as the main rotors 14, the flight device 10 includes the plural rotors: the first main rotor 141 and the second main rotor 142, but may include a single main rotor 14.

In the above description, the degree to which the power transmission connection/disconnection units transmit power is sensed based on the rotational speed. However, the degree to which the power transmission connection/disconnection units transmit power may be sensed based on another physical amount. Specifically, the degree to which the power transmission connection/disconnection units transmit power can be calculated from the difference in temperature or the difference in magnitude of vibrations at each power connection/disconnection unit.

REFERENCE SIGNS LIST

10 FLIGHT DEVICE
121 FIRST MAIN FRAME

122 SECOND MAIN FRAME
131 SUB-FRAME
132 SUB-FRAME
133 SUB-FRAME
134 SUB-FRAME
14 MAIN ROTOR
141 FIRST MAIN ROTOR
142 SECOND MAIN ROTOR
15 SUB-ROTOR
151 SUB-ROTOR
152 SUB-ROTOR
153 SUB-ROTOR
154 SUB-ROTOR
16 GENERATOR
161 GENERATOR
162 GENERATOR
171 GEAR
172 GEAR
18 BATTERY
19 AIRFRAME
21 MOTOR
211 MOTOR
212 MOTOR
213 MOTOR
214 MOTOR
24 ELECTRIC POWER CONVERSION UNIT
241 ELECTRIC POWER CONVERSION UNIT
242 ELECTRIC POWER CONVERSION UNIT
243 ELECTRIC POWER CONVERSION UNIT
244 ELECTRIC POWER CONVERSION UNIT
25 ENGINE-SIDE POWER TRANSMISSION UNIT
251 FIRST ENGINE-SIDE POWER TRANSMISSION UNIT
252 SECOND ENGINE-SIDE POWER TRANSMISSION UNIT
26 ROTOR-SIDE POWER TRANSMISSION UNIT
261 FIRST ROTOR-SIDE POWER TRANSMISSION UNIT
262 SECOND ROTOR-SIDE POWER TRANSMISSION UNIT
27 POWER CONNECTION/DISCONNECTION UNIT
271 FIRST POWER CONNECTION/DISCONNECTION UNIT
272 SECOND POWER CONNECTION/DISCONNECTION UNIT
28 ROTATIONAL SPEED MEASUREMENT UNIT
281 FIRST ROTATIONAL SPEED MEASUREMENT UNIT
282 SECOND ROTATIONAL SPEED MEASUREMENT UNIT
30 ENGINE
31 ARITHMETIC CONTROL UNIT
40 FIRST ENGINE UNIT
41 SECOND ENGINE UNIT
42 FIRST CRANKSHAFT
43 FIRST PISTON
44 FIRST CONNECTING ROD
45 SECOND CRANKSHAFT
46 SECOND PISTON
47 SECOND CONNECTING ROD
48 COMBUSTION CHAMBER
49 CYLINDER

The invention claimed is:

1. A flight device comprising: an airframe; a main rotor; an engine; an engine-side power transmission unit; a rotor-side power transmission unit; a power connection/disconnection unit; and an arithmetic control unit, wherein the main rotor rotates to generate driving force necessary for the airframe to fly and includes a first main rotor and a second main rotor, the engine generates power necessary for the first main rotor and the second main rotor to rotate, the engine-side power transmission unit rotates using the power of the engine and includes a first engine-side power transmission unit and a second engine-side power transmission unit, the rotor-side power transmission unit includes a first rotor-side power transmission unit drivingly connected to the first main rotor and a second rotor-side power transmission unit drivingly connected to the second main rotor, the power connection/disconnection unit transmits the power according to conditions and includes a first power connection/disconnection unit and a second power connection/disconnection unit, the first power connection/disconnection unit is provided between the first engine-side power transmission unit and the first rotor-side power transmission unit, the second power connection/disconnection unit is provided between the second engine-side power transmission unit and the second rotor-side power transmission unit, and the arithmetic control unit changes a flight status when a degree to which the first power connection/disconnection unit transmits the power and a degree to which the second power connection/disconnection unit transmits the power are different by a predetermined value.

2. The flight device according to claim 1, further comprising:

a first rotational speed measurement unit measuring rotational speed of the first rotor-side power transmission unit; and a second rotational speed measurement unit measuring rotational speed of the second rotor-side power transmission unit, wherein the arithmetic control unit changes the flight status when the rotational speed of the first rotor-side power transmission unit measured by the first rotational speed measurement unit and the rotational speed of the second rotor-side power transmission unit measured by the second rotational speed measurement unit are different by a predetermined value.

3. The flight device according to claim 1, wherein in a case of changing the flight status in a landing state, the arithmetic control unit stops the engine.

4. The flight device according to claim 1, wherein in a case of changing the flight status in a flight state, the arithmetic control unit lands the flight device by using the driving force of the engine.

5. The flight device according to claim 1, further comprising:

a sub-rotor; and
a motor that rotates the sub-rotor, wherein
in a case of changing the flight status in a flight state, the arithmetic control unit stops the engine and lands the flight device by rotating the sub-rotor using the motor.

6. The flight device according to claim 1, wherein
in a case of flight from a landing state, the arithmetic control unit cancels the flight when the difference between the degree to which the first power connection/disconnection unit transmits the power and the degree to which the second power connection/disconnection unit transmits the power is greater than a first setting value.

7. The flight device according to claim 1, wherein during flight, the arithmetic control unit lands the flight device while running the engine when the difference between the degree to which the first power connection/disconnection unit transmits the power and the degree to which the second power connection/disconnection unit transmits the power is greater than a second setting value.

8. The flight device according to claim 1, wherein during flight, the arithmetic control unit lands the flight device with the engine stopped when the difference between the degree to which the first power connection/disconnection unit transmits the power and the degree to which the second power connection/disconnection unit transmits the power is greater than a third setting value.

9. The flight device according to claim 1, wherein the arithmetic control unit changes the flight status when the absolute value of the difference between the rotational speed of the first rotor-side power transmission unit and the rotational speed of the second rotor-side power transmission unit is more than or equal to a certain value.

10. A method of controlling a flight device, the flight device comprising: an airframe; a main rotor; an engine; an engine-side power transmission unit; a rotor-side power transmission unit; and a power connection/disconnection unit, wherein the main rotor rotates to generate driving force necessary for the airframe to fly and includes a first main rotor and a second main rotor, the engine generates power necessary for the first main rotor and the second main rotor to rotate, the engine-side power transmission unit rotates using the power of the engine and includes a first engine-side power transmission unit and a second engine-side power transmission unit, the rotor-side power transmission unit includes a first rotor-side power transmission unit drivingly connected to the first main rotor and a second rotor-side power transmission unit drivingly connected to the second main rotor, the power connection/disconnection unit transmits the power according to conditions and includes a first power connection/disconnection unit and a second power connection/disconnection unit, the first power connection/disconnection unit is provided between the first engine-side power transmission unit and the first rotor-side power transmission unit, the second power connection/disconnection unit is provided between the second engine-side power transmission unit and the second rotor-side power transmission unit, and the method comprises:

changing a flight status when a degree to which the first power connection/disconnection unit transmits the power and a degree to which the second power connection/disconnection unit transmits the power are different by a predetermined value.

\* \* \* \* \*